United States Patent
Peterson et al.

(10) Patent No.: US 11,919,409 B2
(45) Date of Patent: Mar. 5, 2024

(54) TERMINAL POSITION ASSURANCE DEVICE FOR A CHARGING INLET ASSEMBLY

(71) Applicant: TE Connectivity Services GmbH, Schaffhausen (CH)

(72) Inventors: Kevin John Peterson, Kernersville, NC (US); Clara Marguerite Rhodes, Winston Salem, NC (US); Hurley Chester Moll, Hershey, PA (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 214 days.

(21) Appl. No.: 17/585,640

(22) Filed: Jan. 27, 2022

(65) Prior Publication Data

US 2022/0242259 A1    Aug. 4, 2022

Related U.S. Application Data

(60) Provisional application No. 63/145,756, filed on Feb. 4, 2021.

(51) Int. Cl.
*B60L 53/16* (2019.01)

(52) U.S. Cl.
CPC ........... *B60L 53/16* (2019.02); *B60L 2270/30* (2013.01)

(58) Field of Classification Search
CPC .............................. B60L 53/16; B60L 2270/30
USPC ........................................................ 320/109
See application file for complete search history.

(56) References Cited

U.S. PATENT DOCUMENTS

| | | | | |
|---|---|---|---|---|
| 10,454,199 | B1* | 10/2019 | Christiano | H01R 13/424 |
| 2016/0104967 | A1* | 4/2016 | Schmidt | H01R 13/5202 |
| | | | | 439/587 |
| 2019/0173220 | A1* | 6/2019 | Bhat | H01R 13/4362 |
| 2020/0094688 | A1* | 3/2020 | Myer | B60L 53/302 |
| 2020/0212630 | A1* | 7/2020 | Qiu | H01R 13/641 |
| 2020/0223321 | A1* | 7/2020 | Myer | H01R 13/4223 |
| 2020/0266578 | A1* | 8/2020 | Durse | B60L 53/302 |
| 2020/0313328 | A1* | 10/2020 | Mathews | H01R 13/35 |
| 2021/0021077 | A1* | 1/2021 | Mathews | H01R 13/5202 |
| 2021/0078419 | A1* | 3/2021 | Lyon | G01K 1/14 |

(Continued)

FOREIGN PATENT DOCUMENTS

| | | | | |
|---|---|---|---|---|
| CN | 111725655 A | * | 9/2020 | B60L 53/16 |
| CN | 111834788 A | * | 10/2020 | H01R 13/4364 |
| CN | 213071501 U | * | 4/2021 | H01R 13/432 |

(Continued)

*Primary Examiner* — Suresh Memula

(57) ABSTRACT

A charging inlet assembly for an electric vehicle includes a charging inlet housing having a chamber at the rear and a power connector at a front for receiving a charging connector. The power connector includes terminal channels. The charging inlet assembly includes charging terminals each having a mating pin and a terminating end. The charging inlet assembly includes a terminal position assurance device coupled to the charging inlet housing having a terminal locating plate located in the chamber to interface with the terminating ends of the charging terminals. The terminal position assurance device includes an actuator at an exterior of the charging inlet housing to operate the terminal position assurance device from the exterior of the charging inlet housing.

20 Claims, 8 Drawing Sheets

(56) References Cited

U.S. PATENT DOCUMENTS

2021/0394626 A1* 12/2021 Genece .................... B60K 6/48
2023/0246405 A1*  8/2023 Hitchcock ............ H01R 13/432
                                                                439/655

FOREIGN PATENT DOCUMENTS

| CN | 214625472 U   * | 11/2021 | .............. B60L 53/16 |
| DE | 102020204472 A1 * | 10/2020 | ......... H01R 13/4364 |
| EP | 3399602 A1 * | 11/2018 | .............. B60L 53/16 |
| EP | 3402007 A1 * | 11/2018 | ................ G01K 1/16 |
| EP | 3402011 A1 * | 11/2018 | ......... H01R 13/5227 |
| EP | 3886263 A1 *  | 9/2021 | ......... H01R 13/4368 |
| WO | WO-2019239247 A1 * | 12/2019 | |
| WO | WO-2020144556 A1 *  | 7/2020 | .............. B60L 53/16 |

* cited by examiner

TERMINAL POSITION ASSURANCE DEVICE FOR A CHARGING INLET ASSEMBLY

CROSS REFERENCE TO RELATED APPLICATIONS

This application claims benefit to U.S. Provisional Application No. 63/145,756, filed 4 Feb. 2021, titled "Externally Actuated, Sealed TPA in a Charging Inlet", the subject matter of which is herein incorporated by reference in its entirety.

BACKGROUND OF THE INVENTION

The subject matter herein relates generally to charging inlet assemblies.

Electric vehicles (EV) and hybrid electric vehicles (HEV) include battery systems for operating the vehicles. The battery systems are charged by a charging connector, which is coupled to a charging inlet assembly of the vehicle. Known charging inlet assemblies of vehicles are not without disadvantages. For instance, the terminals of the charging inlet assemblies need to be properly positioned and retained in the housing. If one of the terminals is improperly positioned or moves within the housing, damage may occur to the terminal or the charging connector.

A need remains for a compact and reliable a charging inlet assembly.

BRIEF DESCRIPTION OF THE INVENTION

In one embodiment, a charging inlet assembly for an electric vehicle is provided and includes a charging inlet housing extending between a front and a rear. The charging inlet housing has a chamber at the rear. The charging inlet housing has a power connector at the front for receiving a charging connector. The power connector including terminal channels between the front and the rear. The charging inlet assembly includes charging terminals coupled to the housing. Each of the charging terminals include a mating pin and a terminating end opposite the mating pin. The mating pin positioned in the corresponding terminal channel for mating with the charging connector. The terminating end positioned in the chamber at the rear of the housing. The charging inlet assembly includes a terminal position assurance device coupled to the charging inlet housing. The terminal position assurance device including a terminal locating plate located in the chamber to interface with the terminating ends of the charging terminals. The terminal position assurance device including an actuator at an exterior of the charging inlet housing to operate the terminal position assurance device from the exterior of the charging inlet housing.

In another embodiment, a charging inlet assembly for an electric vehicle is provided and includes a charging inlet housing extending between a front and a rear. The charging inlet housing has a chamber at the rear. The charging inlet housing including a port open to the chamber. The charging inlet housing has a power connector at the front for receiving a charging connector. The power connector including terminal channels between the front and the rear. The charging inlet assembly includes charging terminals coupled to the housing. Each of the charging terminals include a mating pin and a terminating end opposite the mating pin. The mating pin positioned in the corresponding terminal channel for mating with the charging connector. The terminating end positioned in the chamber at the rear of the housing. The charging inlet assembly includes a terminal position assurance device received in the port. The terminal position assurance device has a device seal sealing coupled to the charging inlet housing. The terminal position assurance device including a terminal locating plate located in the chamber. The terminal position assurance device including an actuator at an exterior of the charging inlet housing actuated to move the terminal position assurance device between an unlocked position and a locked position. The terminal locating plate interfacing with the terminating ends of the charging terminals in the locked position to retain the charging terminals in the corresponding terminal channels.

In a further embodiment, a charging inlet assembly for an electric vehicle is provided and includes a charging inlet housing extending between a front and a rear. The charging inlet housing has a chamber at the rear. The charging inlet housing has a power connector at the front for receiving a charging connector. The power connector including terminal channels between the front and the rear. The charging inlet assembly includes charging terminals coupled to the housing. The charging terminals include a power terminal, a ground terminal, a control pilot terminal, and a proximity pilot terminal. Each of the charging terminals include a mating pin and a terminating end opposite the mating pin. The mating pin positioned in the corresponding terminal channel for mating with the charging connector. The terminating end positioned in the chamber at the rear of the housing. The charging inlet assembly includes a terminal position assurance device coupled to the charging inlet housing. The terminal position assurance device including a terminal locating plate located in the chamber to interface with the power terminal. The ground terminal. The control pilot terminal, and the proximity pilot terminal. The terminal position assurance device including an actuator at an exterior of the charging inlet housing to operate the terminal position assurance device from the exterior of the charging inlet housing.

DETAILED DESCRIPTION OF THE INVENTION

Figure 1:
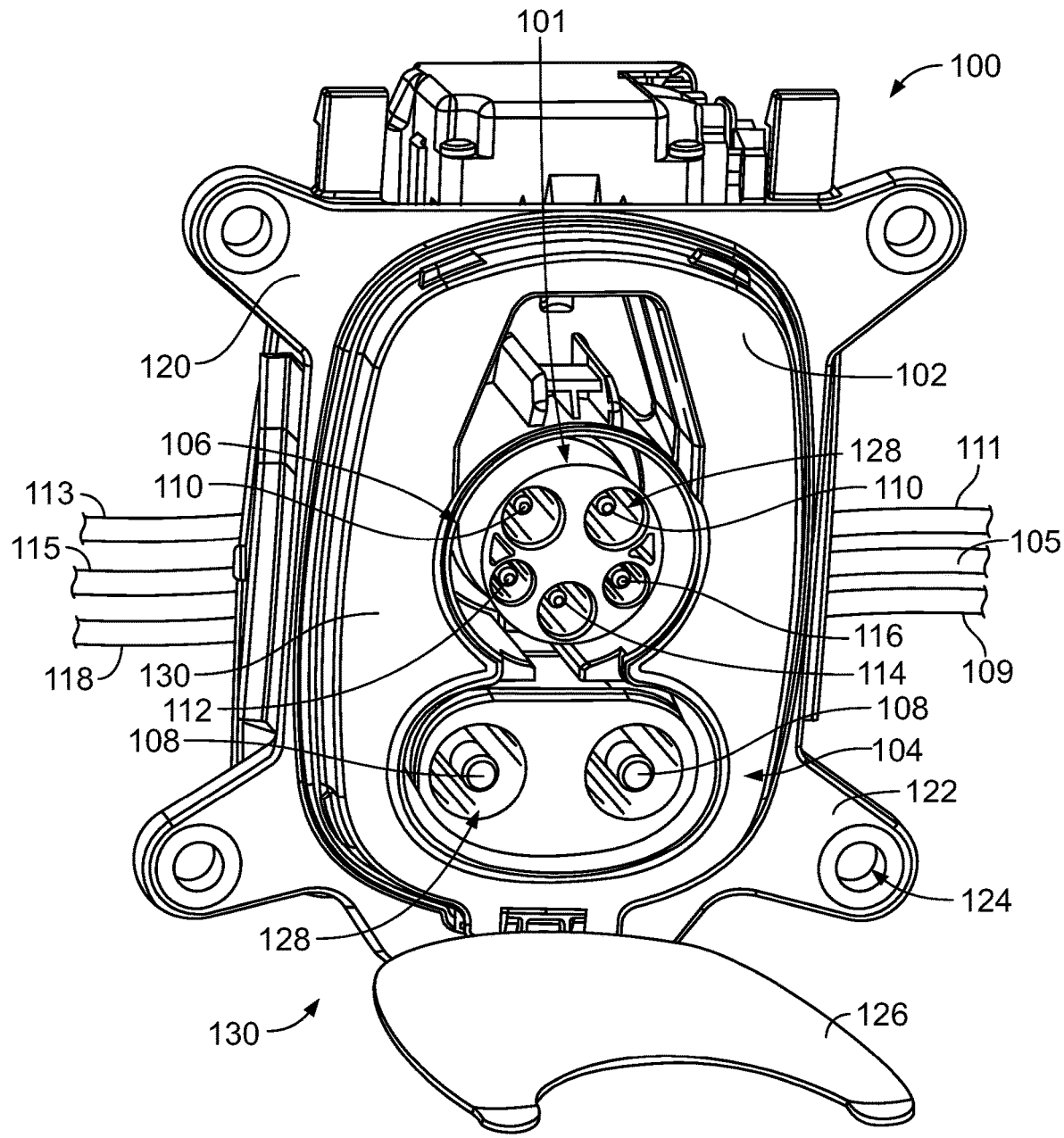
FIG. 1 is a front perspective view of a charging inlet assembly in accordance with an exemplary embodiment.
Figure 2:
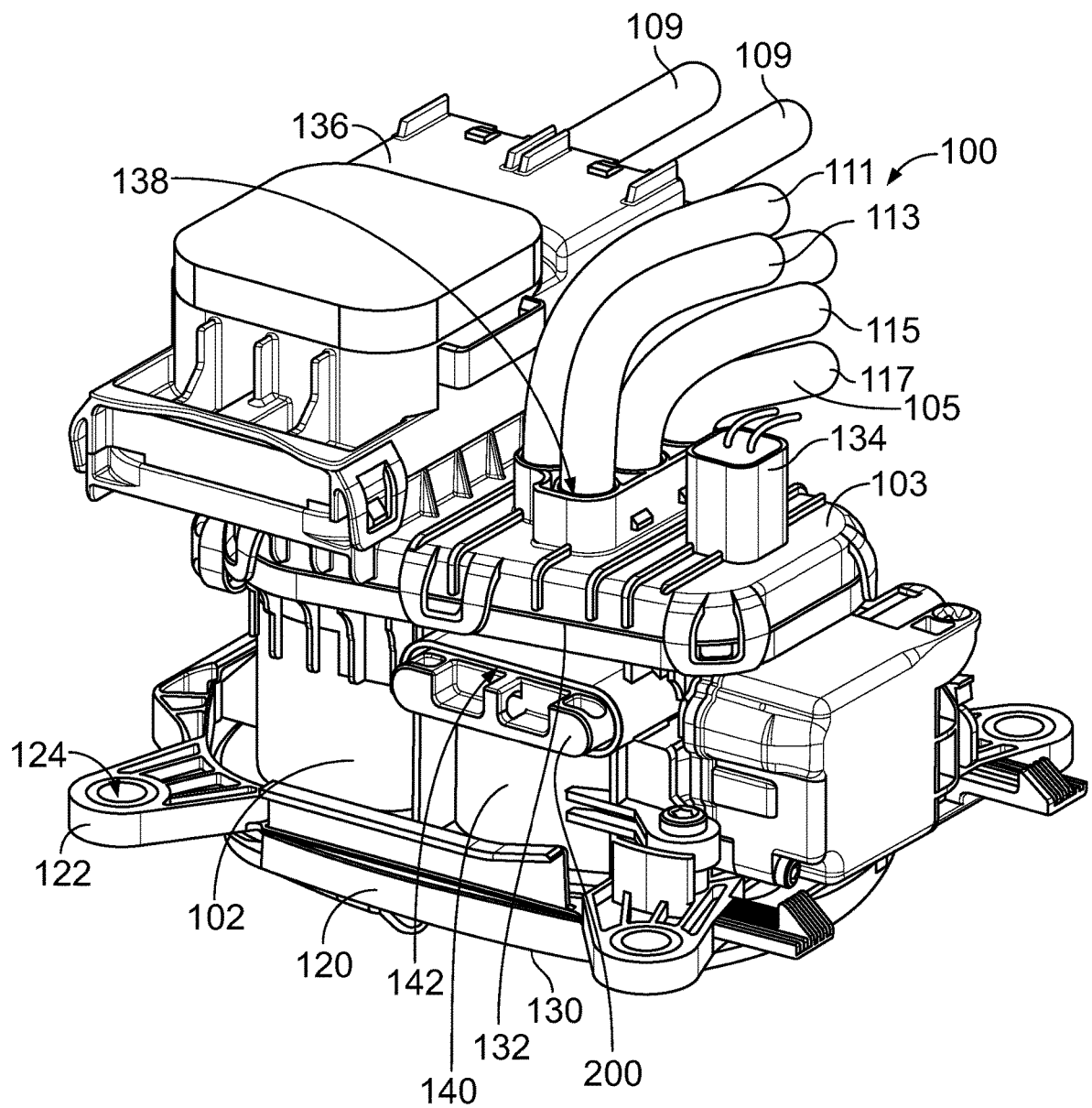
FIG. 2 is rear perspective views of the charging inlet assembly in accordance with an exemplary embodiment.
Figure 3:
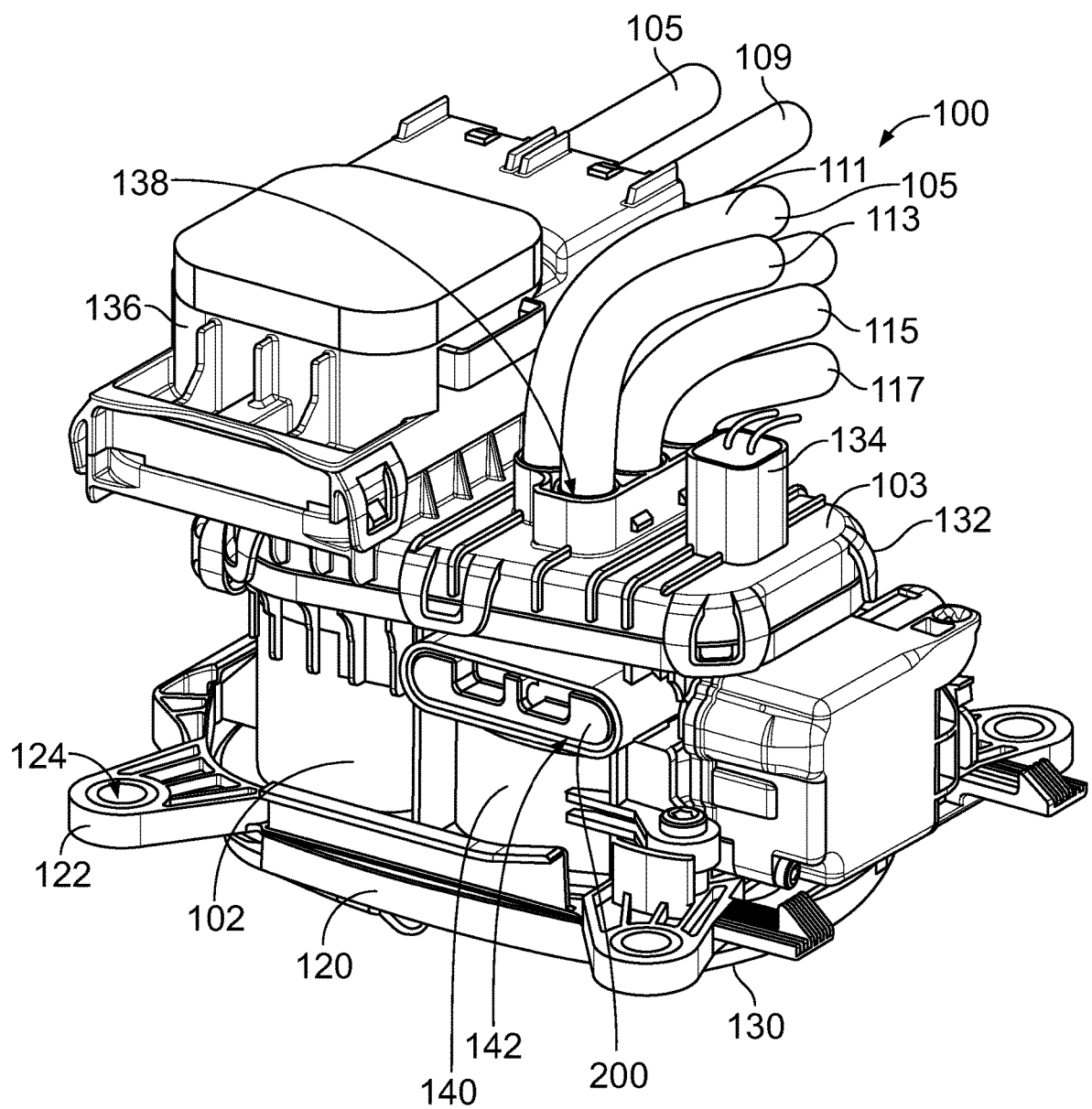
FIG. 3 is rear perspective views of the charging inlet assembly in accordance with an exemplary embodiment.

FIG. 1 is a front perspective view of a charging inlet assembly 100 in accordance with an exemplary embodiment. FIGS. 2 and 3 are rear perspective views of the charging inlet assembly 100 in accordance with an exemplary embodiment. FIG. 2 illustrates the charging inlet assembly 100 with a terminal position assurance device 200 in an unlocked position. FIG. 3 illustrates the charging inlet assembly 100 with the terminal position assurance device 200 in a locked position. The terminal position assurance device 200 is used to assure proper positioning of terminals in the charging inlet assembly 100. The terminal position assurance device 200 is used as a secondary lock to retain the terminals in the charging inlet assembly 100. The terminal position assurance device 200 is accessible from an exterior of the charging inlet assembly 100 for actuation from the exterior of the terminal position assurance device 200. The terminal position assurance device 200 is sealed to prevent moisture and debris from entering the charging inlet assembly 100.

The charging inlet assembly 100 defines a power connector 101 configured to be electrically connected to a charging connector (not shown) for charging a battery system of a vehicle, such as an electric vehicle (EV) or hybrid electric vehicle (HEV). In an exemplary embodiment, the charging inlet assembly 100 is configured for mating with a DC fast charging connector, such as the SAE combo CCS charging connector, in addition to AC charging connectors, such as the SAE J1772 charging connector. In various embodiments, the charging inlet assembly 100 has a CCS1 (5 pin) AC configuration. In other various embodiments, the charging inlet assembly 100 may have a CCS2 (7 pin) AC configuration. Other standard inlet configurations may be used in alternative embodiments.

The charging inlet assembly 100 includes a housing 102 configured to be mounted in the vehicle. The housing 102 forms a portion of the power connector 101 for mating with the charging connector. A rear cover 103 is coupled to a rear of the housing 102 to close out the housing 102 and the internal components of the charging inlet assembly 100. The rear cover 103 may be sealed to the housing 102 to prevent moisture and debris from entering the internal compartment of the housing 102. In an exemplary embodiment, the power connector 101 defines an AC charging portion 104 and a DC charging portion 106. The charging portions 104, 106 may form receptacles or openings that receive a plug of the charging connector. The charging inlet assembly 100 includes a plurality of charging terminals 107 for connection to the charging connector. Wires 105 are electrically connected to the charging terminals 107.

The AC charging portion 104 is configured for mating with an AC charging connector or an AC section of the charging connector. In an exemplary embodiment, the charging terminals 107 of the charging inlet assembly 100 includes AC power terminals 108 (FIG. 1) at the AC charging portion 104, such as a pair of the AC power terminals 108. The AC power terminals 108 are configured to be electrically connected to the AC charging connector. The charging inlet assembly 100 includes AC power wires 109 (FIG. 2) electrically connected to the AC power terminals 108. The AC power wires 109 may be terminated directly to the AC power terminals 108, such as being crimped or welded to the AC power terminals 108. In other embodiments, the AC power wires 109 may be electrically connected to the AC power terminals 108 through a separable interface, such as through connectors mated to the housing 102 at the rear.

The DC charging portion 106 is configured for mating with a DC charging connector or a DC section of the charging connector. In an exemplary embodiment, the charging terminals 107 of the charging inlet assembly 100 includes DC power terminals 110 at the DC charging portion 106, such as a pair of the DC power terminals 110. The charging terminals 107 of the charging inlet assembly 100 include a proximity terminal 112 at the DC charging portion 106. The charging terminals 107 of the charging inlet assembly 100 include a ground terminal 114 at the DC charging portion 106. The charging terminals 107 of the charging inlet assembly 100 include a communication terminal 116 at the DC charging portion 106. The DC power terminals 110, the proximity terminal 112, the ground terminal 114, and the communication terminal 116 are configured to be electrically connected to the DC charging connector.

The charging inlet assembly 100 includes DC power wires 111 (FIG. 2) electrically connected to the DC power terminals 110. The DC power wires 111 may be terminated directly to the DC power terminals 110, such as being crimped or welded to the DC power terminals 110. In other embodiments, the DC power wires 111 may be electrically connected to the DC power terminals 110 through a separable interface, such as through connectors mated to the housing 102 at the rear. In an exemplary embodiment, the DC power terminals 110 and the DC power wires 111 may be rear loaded into the housing 102, such as through the rear cover 103. In an exemplary embodiment, the terminal position assurance device 200 is configured to be operably coupled to the DC power terminals 110 to assure positioning of the DC power terminals 110 in the housing 102.

The charging inlet assembly 100 includes a proximity wire 113 (FIG. 2) electrically connected to the proximity terminal 112. The proximity wire 113 may be terminated directly to the proximity terminal 112, such as being crimped or welded to the proximity terminal 112. In other embodiments, the proximity wire 113 may be electrically connected to the proximity terminal 112 through a separable interface, such as through connectors mated to the housing 102 at the rear. In an exemplary embodiment, the proximity terminal 112 and the proximity wire 113 may be rear loaded into the housing 102, such as through the rear cover 103. In an exemplary embodiment, the terminal position assurance device 200 is configured to be operably coupled to the proximity terminal 112 to assure positioning of the proximity terminal 112 in the housing 102.

The charging inlet assembly 100 includes a ground wire 115 (FIG. 2) electrically connected to the ground terminal 114. The ground wire 115 may be terminated directly to the ground terminal 114, such as being crimped or welded to the ground terminal 114. In other embodiments, the ground wire 115 may be electrically connected to the ground terminal 114 through a separable interface, such as through connectors mated to the housing 102 at the rear. In an exemplary embodiment, the ground terminal 114 and the ground wire 115 may be rear loaded into the housing 102, such as through the rear cover 103. In an exemplary embodiment, the terminal position assurance device 200 is configured to be operably coupled to the ground terminal 114 to assure positioning of the ground terminal 114 in the housing 102.

The charging inlet assembly 100 includes a communication wire 117 (FIG. 2) electrically connected to the communication terminal 116. The communication wire 117 may be terminated directly to the communication terminal 116, such as being crimped or welded to the communication terminal 116. In other embodiments, the communication wire 117 may be electrically connected to the communication terminal 116 through a separable interface, such as through connectors mated to the housing 102 at the rear. In an exemplary embodiment, the communication terminal 116 and the communication wire 117 may be rear loaded into the housing 102, such as through the rear cover 103. In an exemplary embodiment, the terminal position assurance device 200 is configured to be operably coupled to the communication terminal 116 to assure positioning of the communication terminal 116 in the housing 102.

The wires 109, 111, 113, 115, 117 extend from the charging inlet assembly 100 to another component of the vehicle, such as the battery system of the vehicle. Optionally, one or more of the wires 109, 111, 113, 115, 117 may be electrically connected to a battery control unit (not shown) of the battery system. The power wires 109, 111 transmit power, such as to the battery of the vehicle. The AC power wires 109 may transmit high voltage for charging the battery and the DC power wires 111 may transmit low voltage for charging the battery. The ground wire 115 may be electrically grounded, such as to a portion of the vehicle. The proximity wire 113 and the communication wire 117 may transmit data between the charging inlet assembly 100 and the battery system, such as data relating to the charging operation. For example, the communication wire 117 may transmit data relating to charging start/stop, operating temperature of the power terminals 108 and/or 110, or other charging data. The proximity wire 113 may send a proximity signal to the battery system indicating when the charging device is mated to the power connector 101 of the charging inlet assembly 100.

The charging inlet assembly 100 includes a mounting flange 120 coupled to the housing 102. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

In an exemplary embodiment, the charging inlet assembly 100 includes a terminal cover 126 (FIG. 1) at a front 130 of the housing 102. The terminal cover 126 is hingedly coupled to the mounting flange 120 and/or the housing 102. The terminal cover 126 is used to cover portions of the housing 102, such as the power connector 101. The terminal cover 126 may be used to cover the AC power terminals 108 and/or the DC power terminals 110, which are located in corresponding terminal channels 128 in the housing 102.

The rear cover 103 is provided at a rear 132 of the housing 102 to close access to a rear chamber 133 at the rear 132 of the housing 102. The rear cover 103 may be clipped or latched onto the main part of the housing 102, such as using clips or latches. Other types of securing features, such as fasteners may be used in alternative embodiments. A perimeter seal may be provided between the rear cover 103 and the housing 102. Optionally, the terminals and wires may be loaded through openings 138 in the rear cover 103 to the interior of the housing 102. In an exemplary embodiment, the terminals and wires are loaded into the openings 138 without removing the rear cover 103 from the housing 102. As such, the housing 102 does not need to be unsealed or opened to assemble the terminals and wires to the housing 102. The wires may be sealed to the rear cover 103, such as using wire seals (not shown).

In an exemplary embodiment, the charging inlet assembly 100 includes one or more low-voltage connectors 134 (FIG. 2) configured to be coupled to the housing 102 at the rear 132. The low voltage connector(s) 134 are configured to be electrically connected to the DC portion, such as the DC power terminals 110 and/or the proximity terminal 112, the ground terminal 114, and the communication terminal 116. The wires 111, 113, 115, 117 may form portions of the low voltage connector(s) 134. The low-voltage connectors 134 are configured to be coupled to other components in the system, such as a battery distribution unit, to control charging of the vehicle. The low-voltage connectors 134 may transmit/receive signals relating to charging, such as status of connection, status of charge, voltage of charge, and the like. Seals may be provided at the interface between the low-voltage connectors 134 and the housing 102.

In an exemplary embodiment, the charging inlet assembly 100 includes one or more high-voltage connectors 136 (FIG. 2) configured to be coupled to the housing 102 at the rear 132. The high voltage connector(s) 136 are configured to be electrically connected to the AC portion, such as the AC power terminals 108. The wires 109 may form portions of the high voltage connector(s) 136. The high voltage connector(s) 136 are configured to be coupled to other components in the system, such as the battery of the vehicle. Seals may be provided at the interface between the high voltage connector(s) 136 and the housing 102.

In an exemplary embodiment, the terminal position assurance device 200 forms a secondary lock used to lock the corresponding charging terminals 107 in the terminal channels 128 in the housing 102. The terminal position assurance device 200 blocks removal of the charging terminals 107 from the terminal channels 128 in the housing 102. In an exemplary embodiment, the terminal position assurance device 200 provides a visual indicator to the installer that the charging terminals 107 are properly or fully installed in the housing 102. For example, the terminal position assurance device 200 may be blocked from moving to a locked position unless the charging terminals 107 are fully loaded into the housing 102.

The terminal position assurance device 200 is provided at an exterior of the housing 102. The terminal position assurance device 200 is accessible when the rear cover 103 is coupled to the housing 102. In the illustrated embodiment, the terminal position assurance device 200 is provided at a side 140 of the housing 102, such as forward of the rear cover 103. The terminal position assurance device 200 is loaded into a port 142 at the side 140. A portion of the terminal position assurance device 200 is accessible from the exterior of the housing 102. The terminal position assurance device 200 is movable relative to the housing 102. The terminal position assurance device 200 may be moved from an unlocked position (FIG. 2) to a locked position (FIG. 3). For example, the terminal position assurance device 200 may be pushed inward into the housing 102 to the locked position. Optionally, the terminal position assurance device 200 may stand proud (extend from) the exterior of the housing in the unlocked position and may be flush with the exterior of the housing 102 in the locked position.

Figure 4:
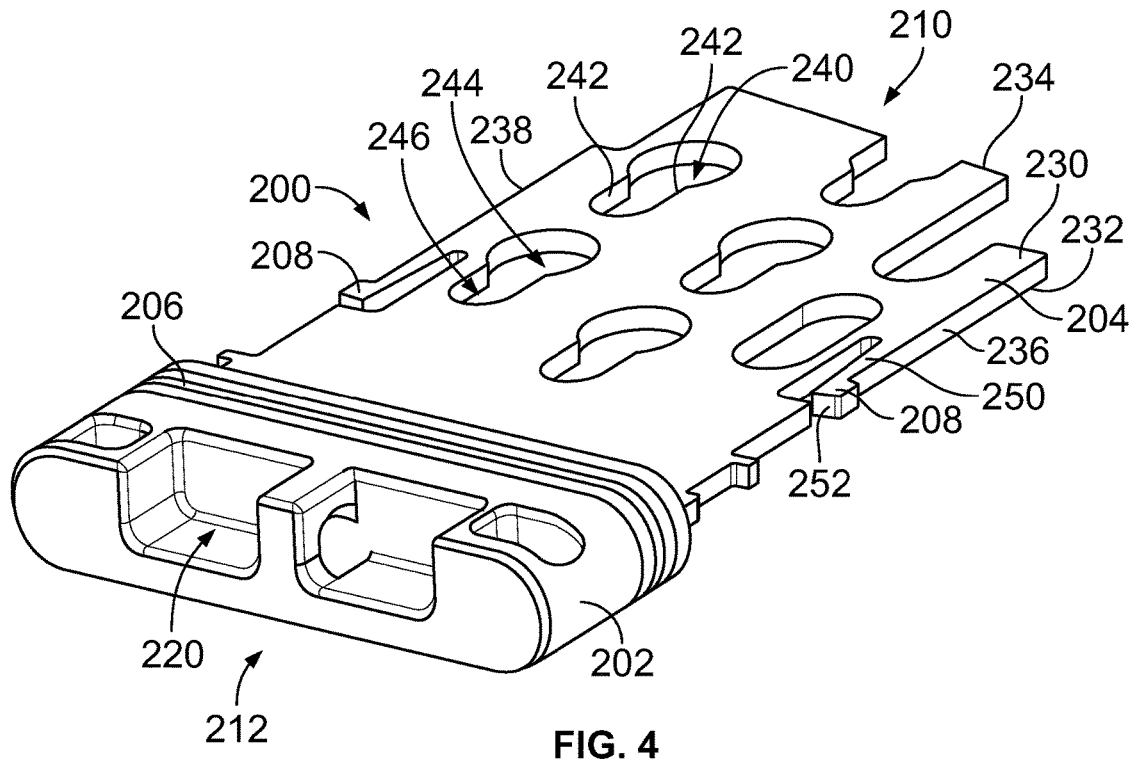
FIG. 4 is a perspective view of the terminal position assurance device in accordance with an exemplary embodiment.
Figure 5:
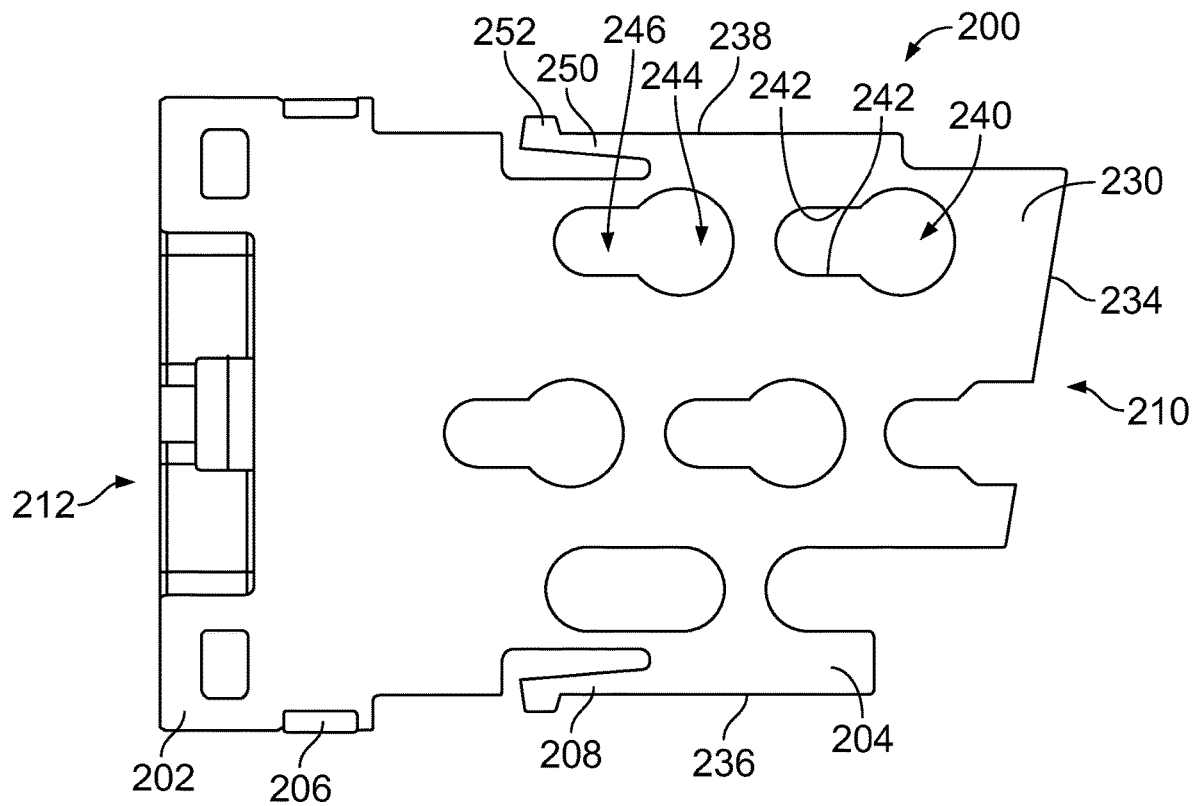
FIG. 5 is a top view of the terminal position assurance device in accordance with an exemplary embodiment.

FIG. 4 is a perspective view of the terminal position assurance device 200 in accordance with an exemplary embodiment. FIG. 5 is a top view of the terminal position assurance device 200 in accordance with an exemplary embodiment. In an exemplary embodiment, the terminal position assurance device 200 includes an actuator 202 and a terminal locating plate 204. In various embodiments, the terminal position assurance device 200 includes a device seal 206 coupled to the actuator 202 or the terminal locating plate 204. In various embodiments, the terminal position assurance device 200 includes a securing feature 208 used to secure the terminal position assurance device 200 to the housing 102 of the charging inlet assembly 100.

The terminal position assurance device 200 is manufactured from a dielectric material, such as a plastic material. For example, the terminal position assurance device 200 may be a molded plastic part. The terminal position assurance device 200 extends between an inner end 210 and an outer end 212. The inner end 210 is positioned in the interior of the housing 102. The outer end 212 is positioned at the exterior of the housing 102. In an exemplary embodiment, the actuator 202 is provided at the outer end 212. The terminal locating plate 204 is provided at the inner end 210. In various embodiments, the terminal locating plate 204 may extend from the actuator 202.

The actuator 202 is configured to be positioned exterior of the housing 102. The actuator 202 is accessible at the exterior and may be actuated to move the terminal position assurance device 200 between the unlocked position and the locked position. For example, the actuator 202 may be pressed or pushed inward. In the illustrated embodiment, the actuator 202 is a push button. However, other types of actuators may be used in alternative embodiments, such as a lever, a dial, a slider, and the like. In the illustrated embodiment, the actuator 202 is oval shaped. However, the actuator 202 may have other shapes in alternative embodiments. The actuator 202 includes an opening 220 configured to receive a tool to release the terminal position assurance device 200 and move the actuator 202 from the locked position to the unlocked position. In other embodiments, the actuator 202 may include a release lever or pull tab to release the terminal position assurance device 200 from the locked position.

In an exemplary embodiment, the terminal locating plate 204 is planar. The terminal locating plate 204 includes a front side 230 and a rear side 232. The terminal locating plate 204 extends to an edge 234. The edge 234 is opposite the actuator 202. Edges 236, 238 extend between the actuator 202 and the edge 234. The terminal locating plate 204 may be generally rectangular shaped; however, the terminal locating plate 204 may have other shapes. The terminal locating plate 204 includes one or more openings 240 and one or more stop tabs 242 adjacent the openings 240. Each opening 240 is configured to receive a corresponding charging terminal 107 (shown in FIG. 1). The stop tabs 242 are used to block removal of the charging terminals 107 through the opening 240. The opening 240 includes a non-blocking portion 244 and a blocking portion 246. The blocking portion 246 has a different shape compared to the non-blocking portion 244. For example, the non-blocking portion 244 may be sized smaller than the blocking portion 246. The non-blocking portion 244 may have a larger diameter and the blocking portion 246 may have a smaller diameter. The stop tabs 242 extend along the blocking portion 246. Optionally, stop tabs 242 may be provided at both sides of the opening 240 to reduce the size of the opening 240 from both sides.

The device seal 206 is coupled to the actuator 202. The device seal 206 circumferentially surrounds the actuator 202. The device seal 206 may be a rubber seal. However, other types of seals may be used in alternative embodiments.

In an exemplary embodiment, the securing features 208 are provided along the edges 236, 238. In the illustrated embodiment, the securing features 208 are deflectable latches. Each securing feature 208 includes a latch arm 250 and a latching finger 252 extending from the latch arm 250. The latch arms 250 are deflectable.

Figure 6:
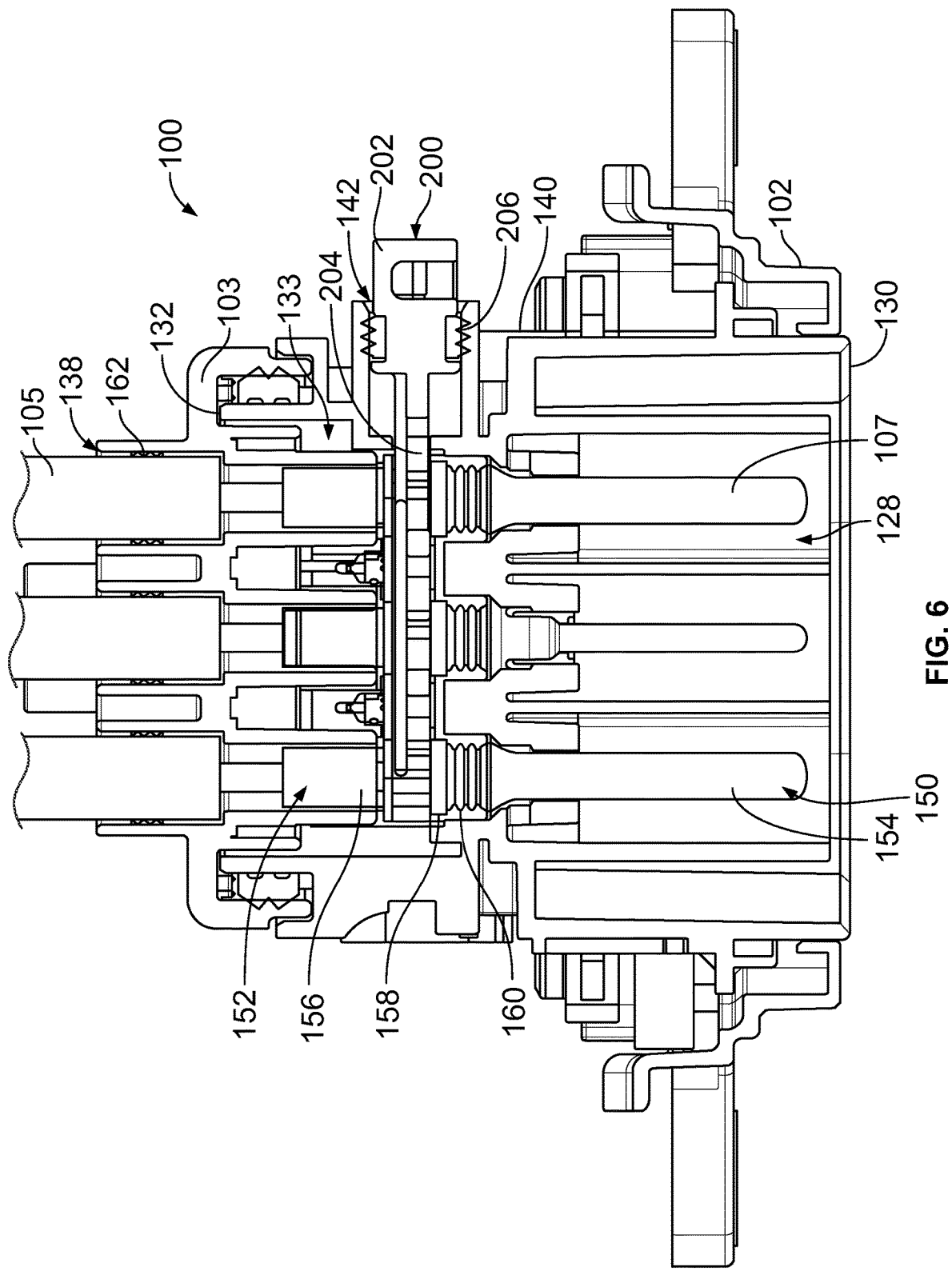
FIG. 6 is a cross-sectional view of the charging inlet assembly in accordance with an exemplary embodiment showing the terminal position assurance device in the unlocked position.
Figure 7:
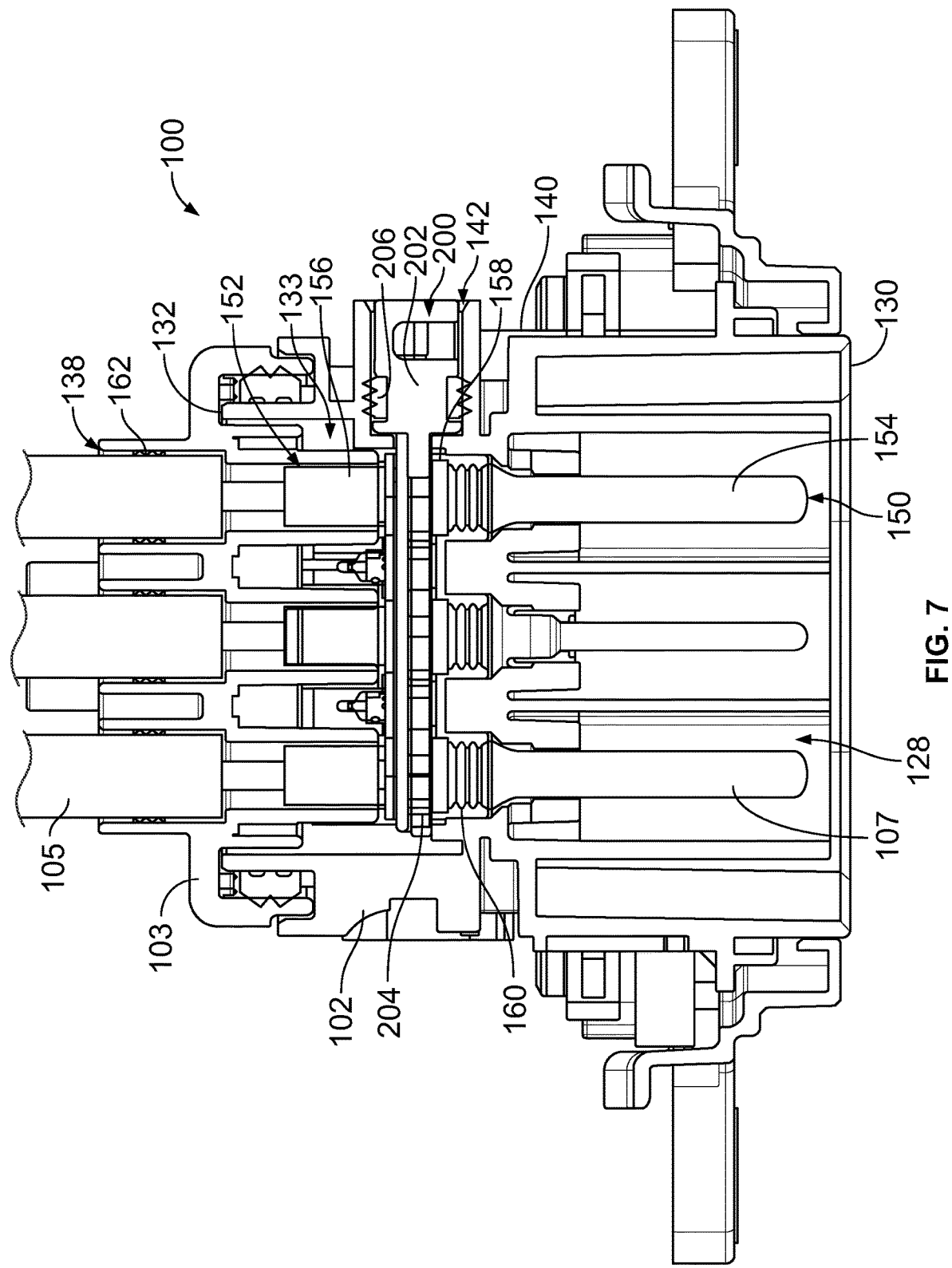
FIG. 7 is a cross-sectional view of the charging inlet assembly in accordance with an exemplary embodiment showing the terminal position assurance device in the locked position.

FIG. 6 is a cross-sectional view of the charging inlet assembly 100 in accordance with an exemplary embodiment showing the terminal position assurance device 200 in the unlocked position. FIG. 7 is a cross-sectional view of the charging inlet assembly 100 in accordance with an exemplary embodiment showing the terminal position assurance device 200 in the locked position.

In an exemplary embodiment, the charging terminals 107 are configured to be loaded into the housing 102 from the rear, such as through the openings 138 in the rear cover 103. Each charging terminal 107 (for example, terminals 110, 112, 114, 116 shown in FIG. 1) includes a mating end 150 and a terminating end 152. The mating end 150 includes a pin 154 configured for mating with the charging connector. The pin 154 extends into the terminal channel 128 and extends to the front 130 of the housing 102. The terminating end 152 is located in the rear chamber 133 at the rear 132 of the housing 102. The rear cover 103 is coupled to the rear 132 o the housing 102 behind the charging terminals 107. In various embodiments, the terminating end 152 includes a wire barrel 156 configured to receive the corresponding wire 105 (for example, the wires 111, 113, 115, 117 shown in FIG. 1). The wire barrel 156 may be crimped or welded to the corresponding wire 105. Other types of termination ends may be provided in alternative embodiments, such as a weld pad. In an exemplary embodiment, the charging terminal 107 includes a flange 158. For example, the flange 158 may be located along the terminating end 152. The charging terminal 107 includes a seal 160 configured to be sealed against the housing 102, such as in the corresponding terminal channel 128. Wire seals 162 are coupled to the wires 105, which are configured to be sealed against the rear cover 103, such as in the corresponding opening 138.

During assembly, the rear cover 103 is coupled to the rear 132 of the charging inlet housing 102 to close out the rear chamber 133. The rear cover 103 is sealed to the housing 102. During assembly, the terminal position assurance device 200 is received in the port 142 in the side 140 of the housing 102. The terminal locating plate 204 is located in the rear chamber 133 forward of the rear cover 103. The actuator 202 is located at the exterior of the housing 102 for actuation by the installer from the exterior of the housing 102. The device seal 206 is sealing coupled to the actuator 202 and to the housing 102 to seal the port 142. During assembly, the charging terminals 107 are loaded into the housing 102 through the rear cover 103 and the terminal locating plate 204. The charging terminals 107 are coupled to the housing 102, such as using latches. The terminal position assurance device 200 is positioned in the unlocked position (FIG. 6) during loading of the charging terminals 107 into the housing 102 through the rear cover 103.

After the charging terminals 107 are fully loaded (for example, pins 154 in the terminal channels 128), the terminal position assurance device 200 is moved to the locked position (FIG. 7). The actuator 202 is actuated to move the terminal position assurance device 200 between the unlocked position and the locked position. In an exemplary embodiment, the terminal locating plate 204 is slidable in an actuating direction in the chamber 133 between the unlocked position and the locked position. In the illustrated embodiment, the actuating direction is perpendicular to terminal axes of the charging terminals 107. The actuator 202 is movable in the port 142. In an exemplary embodiment, the device seal 206 is movable with the actuator 202 in the port 142. The device seal 206 is sealing coupled to the housing 102 in the unlocked position and in the locked position. As such, the device seal 206 seals the port 142 even if unactuated.

In the locked position (FIG. 7), the terminal locating plate 204 interfaces with the terminating ends 152 of the charging terminals 107 in the locked position to retain the charging terminals 107 in the corresponding terminal channels 128. For example, the terminal locating plate 204 is slid to a position immediately rearward of the flanges 158 to interface with the flanges 158 and block rearward movement of the charging terminals 107. In the locked position, the terminal locating plate 204 operates as a secondary lock to retain the charging terminals 107 in the housing 102.

Figure 8:
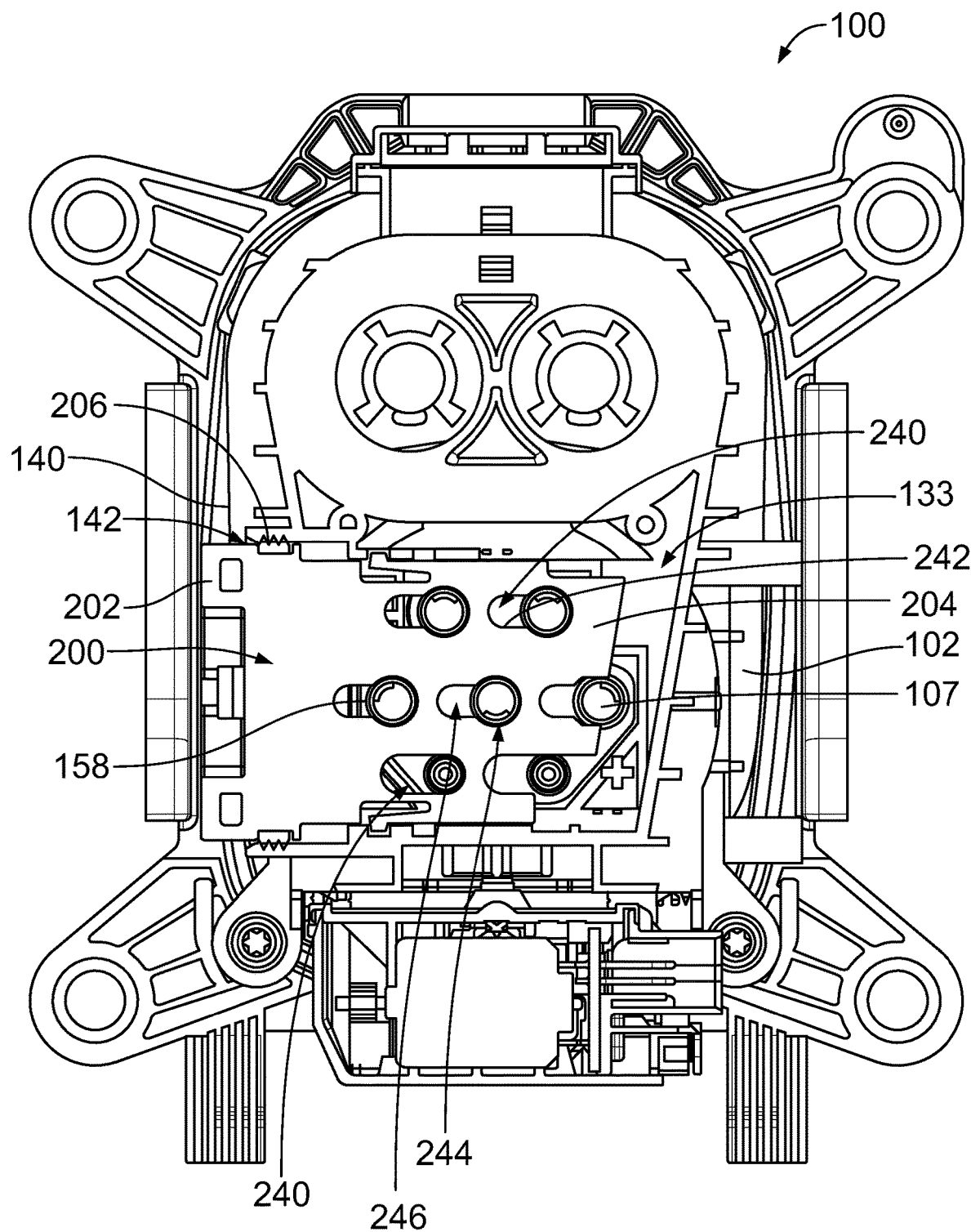
FIG. 8 is a cross-sectional view of the charging inlet assembly in accordance with an exemplary embodiment showing the terminal position assurance device in the unlocked position.
Figure 9:
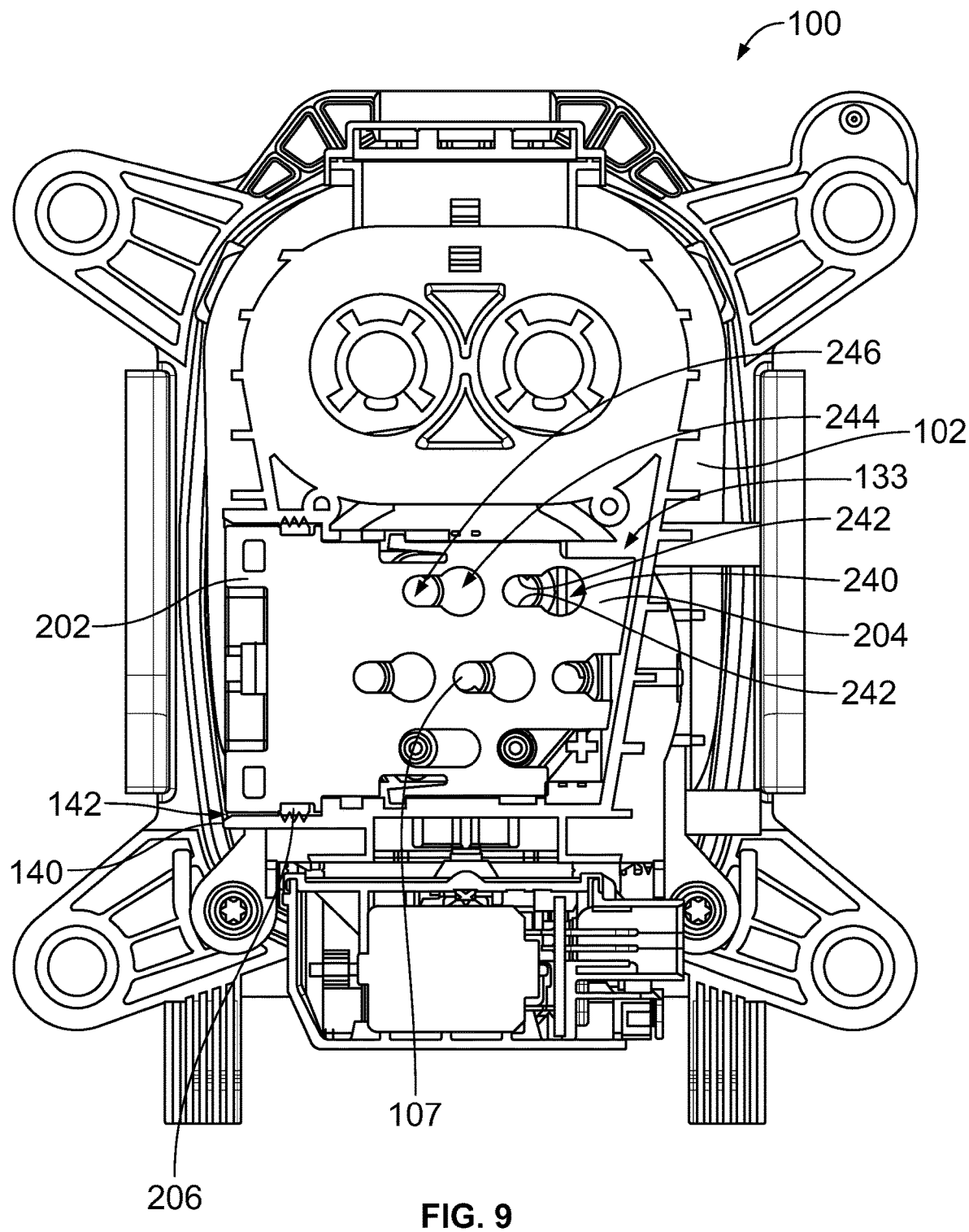
FIG. 9 is a cross-sectional view of the charging inlet assembly in accordance with an exemplary embodiment showing the terminal position assurance device in the locked position.

FIG. 8 is a cross-sectional view of the charging inlet assembly 100 in accordance with an exemplary embodiment showing the terminal position assurance device 200 in the unlocked position. FIG. 9 is a cross-sectional view of the charging inlet assembly 100 in accordance with an exemplary embodiment showing the terminal position assurance device 200 in the locked position.

During assembly, the terminal position assurance device 200 is received in the port 142 in the side 140 of the housing 102. The actuator 202 is located at the exterior of the housing 102 for actuation by the installer from the exterior of the housing 102. The device seal 206 is sealing coupled to the actuator 202 and to the housing 102 to seal the port 142. During assembly, the charging terminals 107 are loaded into the housing 102 through the openings 240 in the terminal locating plate 204, such as through the non-blocking portion 244. The terminal position assurance device 200 is positioned in the unlocked position (FIG. 8) during loading of the charging terminals 107 into the housing 102. The openings 240, at the non-blocking portion 244, each have a larger diameter than the charging terminal 107, such as larger than the flange 158. The flange 158 is able to pass through the non-blocking portion 244 of the terminal locating plate 204.

Once the charging terminals 107 are fully loaded, the terminal position assurance device 200 is moved to the locked position (FIG. 9). The actuator 202 is actuated to move the terminal position assurance device 200 between the unlocked position and the locked position. The terminal locating plate 204 is slidable in the actuating direction in the chamber 133 to the locked position. The actuator 202 is movable in the port 142. In an exemplary embodiment, the device seal 206 is movable with the actuator 202 in the port 142. The device seal 206 is sealing coupled to the housing 102 in the unlocked position and in the locked position. As such, the device seal 206 seals the port 142 even if unactuated.

In the locked position (FIG. 7), the blocking portion 246 are moved into alignment with the flange 158. The stop tabs 242 are axially aligned with the flanges 158 to interface with the charging terminals 107 and block removal of the charging terminals 107 from the housing 102. The stop tabs 242 of the terminal locating plate 204 are slid to a position immediately rearward of the flanges 158 to interface with the flanges 158 and block rearward movement of the charging terminals 107. In the locked position, the terminal locating plate 204 operates as a secondary lock to retain the charging terminals 107 in the housing 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly for an electric vehicle comprising:
    a charging inlet housing extending between a front and a rear, the charging inlet housing having a chamber at the rear, the charging inlet housing having a power connector at the front for receiving a charging connector, the power connector including terminal channels between the front and the rear;
    charging terminals coupled to the housing, each of the charging terminals including a mating pin and a terminating end opposite the mating pin, the mating pin positioned in the corresponding terminal channel for mating with the charging connector, the terminating end positioned in the chamber at the rear of the housing; and
    a terminal position assurance device coupled to the charging inlet housing, the terminal position assurance device including a terminal locating plate located in the chamber to interface with the terminating ends of the charging terminals, the terminal position assurance device including an actuator at an exterior of the charging inlet housing to operate the terminal position assurance device from the exterior of the charging inlet housing.

2. The charging inlet assembly of claim 1, wherein the actuator is operated to move the terminal locating plate between an unlocked position and a locked position, the terminal locating plate interfacing with the terminating ends of the charging terminals in the locked position.

3. The charging inlet assembly of claim 1, wherein the terminal position assurance device includes a device seal sealingly coupled to the charging inlet housing.

4. The charging inlet assembly of claim 1, wherein the terminal locating plate is slidable in an actuating direction in the chamber between an unlocked position and a locked position, the actuating direction being perpendicular to terminal axes of the charging terminals.

5. The charging inlet assembly of claim 1, wherein the charging inlet housing includes a port, the terminal position assurance device being received in the port and movable within the port between an unlocked position and a locked position, the terminal position assurance device including a device seal sealingly coupled to the charging inlet housing in both the unlocked position and the locked position.

6. The charging inlet assembly of claim 1, wherein the terminal locating plate includes terminal openings sized to receive the charging terminals therethrough, the terminal locating plate including stop tabs adjacent to the terminal openings, the stop tabs configured to interface with the terminating ends of the charging terminals when the actuator is actuated.

7. The charging inlet assembly of claim 6, wherein the charging terminals are configured to be loaded into the terminal channels through the terminal openings in the terminal locating plate to loaded positions, the terminal position assurance device configured to be actuated to a locked position after the charging terminals are in the loaded positions, the stop tabs blocking removal of the charging terminals from the charging inlet housing in the locked position.

8. The charging inlet assembly of claim 1, further comprising a rear cover coupled to the rear of the charging inlet housing to close out the chamber, the rear cover includes openings, the charging terminals having wires coupled to the terminating ends of the charging terminals, the wires passing through the openings in the rear cover to the exterior of the charging inlet housing, the wires including wire seals sealingly coupled to the rear cover.

9. The charging inlet assembly of claim 1, wherein the charging terminals include flanges, the terminal locating plate configured to be moved to a blocking position rearward of the flanges to block removal of the charging terminals from the terminal channels.

10. A charging inlet assembly for an electric vehicle comprising:
a charging inlet housing extending between a front and a rear, the charging inlet housing having a chamber at the rear, the charging inlet housing including a port open to the chamber, the charging inlet housing having a power connector at the front for receiving a charging connector, the power connector including terminal channels between the front and the rear;
charging terminals coupled to the housing, each of the charging terminals including a mating pin and a terminating end opposite the mating pin, the mating pin positioned in the corresponding terminal channel for mating with the charging connector, the terminating end positioned in the chamber at the rear of the housing; and
a terminal position assurance device received in the port, the terminal position assurance device having a device seal sealing coupled to the charging inlet housing, the terminal position assurance device including a terminal locating plate located in the chamber, the terminal position assurance device including an actuator at an exterior of the charging inlet housing actuated to move the terminal position assurance device between an unlocked position and a locked position, the terminal locating plate interfacing with the terminating ends of the charging terminals in the locked position to retain the charging terminals in the corresponding terminal channels.

11. The charging inlet assembly of claim 10, wherein the terminal locating plate is slidable in an actuating direction in the chamber between the unlocked position and the locked position, the actuating direction being perpendicular to terminal axes of the charging terminals.

12. The charging inlet assembly of claim 10, wherein the terminal locating plate includes terminal openings sized to receive the charging terminals therethrough, the terminal locating plate including stop tabs adjacent to the terminal openings, the stop tabs configured to interface with the terminating ends of the charging terminals when the actuator is actuated.

13. The charging inlet assembly of claim 12, wherein the charging terminals are configured to be loaded into the terminal channels through the terminal openings in the terminal locating plate to loaded positions, the terminal position assurance device configured to be actuated to the locked position after the charging terminals are in the loaded positions, the stop tabs blocking removal of the charging terminals from the charging inlet housing in the locked position.

14. The charging inlet assembly of claim 10, further comprising a rear cover coupled to the rear of the charging inlet housing to close out the chamber, the rear cover includes openings, the charging terminals having wires coupled to the terminating ends of the charging terminals, the wires passing through the openings in the rear cover to the exterior of the charging inlet housing, the wires including wire seals sealingly coupled to the rear cover.

15. The charging inlet assembly of claim 10, wherein the charging terminals include flanges, the terminal locating plate configured to be moved to a blocking position rearward of the flanges to block removal of the charging terminals from the terminal channels.

16. A charging inlet assembly for an electric vehicle comprising:
a charging inlet housing extending between a front and a rear, the charging inlet housing having a chamber at the rear, the charging inlet housing having a power connector at the front for receiving a charging connector, the power connector including terminal channels between the front and the rear;
charging terminals coupled to the housing, the charging terminals including a power terminal, a ground terminal, a control pilot terminal, and a proximity pilot terminal, each of the charging terminals including a mating pin and a terminating end opposite the mating pin, the mating pin positioned in the corresponding terminal channel for mating with the charging connector, the terminating end positioned in the chamber at the rear of the housing; and
a terminal position assurance device coupled to the charging inlet housing, the terminal position assurance device including a terminal locating plate located in the chamber to interface with the power terminal, the ground terminal, the control pilot terminal, and the proximity pilot terminal, the terminal position assurance device including an actuator at an exterior of the charging inlet housing to operate the terminal position assurance device from the exterior of the charging inlet housing.

17. The charging inlet assembly of claim 16, wherein the terminal position assurance device includes a device seal sealingly coupled to the charging inlet housing.

18. The charging inlet assembly of claim 16, wherein the terminal locating plate is slidable in an actuating direction in the chamber between an unlocked position and a locked position, the actuating direction being perpendicular to terminal axes of the charging terminals.

19. The charging inlet assembly of claim 16, wherein the charging inlet housing includes a port, the terminal position assurance device being received in the port and movable within the port between an unlocked position and a locked position, the terminal position assurance device including a device seal sealingly coupled to the charging inlet housing in both the unlocked position and the locked position.

20. The charging inlet assembly of claim 16, wherein the terminal locating plate includes terminal openings sized to receive the charging terminals therethrough, the terminal locating plate including stop tabs adjacent to the terminal openings, the stop tabs configured to interface with the terminating ends of the charging terminals when the actuator is actuated, the charging terminals are configured to be loaded into the terminal channels through the terminal openings in the terminal locating plate to loaded positions, the terminal position assurance device configured to be actuated to a locked position after the charging terminals are in the loaded positions, the stop tabs blocking removal of the charging terminals from the charging inlet housing in the locked position.

\* \* \* \* \*